US012511617B2

(12) United States Patent
Kruger

(10) Patent No.: US 12,511,617 B2
(45) Date of Patent: Dec. 30, 2025

(54) METHODS, DEVICES, AND SYSTEMS FOR IMPROVING MATERIAL HANDLER EFFICIENCY

(71) Applicant: Steven Kruger, Simpsonville, SC (US)

(72) Inventor: Steven Kruger, Simpsonville, SC (US)

( * ) Notice: Subject to any disclaimer, the term of this patent is extended or adjusted under 35 U.S.C. 154(b) by 383 days.

(21) Appl. No.: 18/151,756

(22) Filed: Jan. 9, 2023

(65) Prior Publication Data

US 2024/0232799 A1    Jul. 11, 2024

(51) Int. Cl.
*G06Q 10/087*    (2023.01)
*G06Q 10/0639*    (2023.01)

(52) U.S. Cl.
CPC ..... *G06Q 10/087* (2013.01); *G06Q 10/06398* (2013.01)

(58) Field of Classification Search
CPC .......... G06Q 10/087; G06Q 10/06398
See application file for complete search history.

(56) References Cited

U.S. PATENT DOCUMENTS

| | | | | |
|---|---|---|---|---|
| 2005/0149256 A1* | 7/2005 | Lawitzky | ............ | G05D 1/0274 701/408 |
| 2007/0282482 A1* | 12/2007 | Beucher | ................ | G06Q 10/08 700/226 |
| 2009/0082968 A1* | 3/2009 | Tanaka | ................ | G01B 11/002 701/300 |
| 2013/0096735 A1* | 4/2013 | Byford | ................ | G05D 1/0234 701/28 |
| 2014/0350783 A1* | 11/2014 | Chamberlin | ........... | B60K 35/22 701/36 |
| 2016/0200240 A1* | 7/2016 | Quinlan | ............... | H05B 47/115 315/80 |
| 2016/0350701 A1* | 12/2016 | Brehm | ................ | G05D 1/0297 |
| 2019/0156086 A1* | 5/2019 | Plummer | ............... | H04N 23/45 |
| 2019/0258266 A1* | 8/2019 | Kirk | ....... | G05D 1/0265 |
| 2020/0250610 A1* | 8/2020 | Schoening | ....... | G06K 19/07749 |
| 2021/0309460 A1* | 10/2021 | Kim | ..... | B65G 1/1373 |
| 2022/0083964 A1* | 3/2022 | Silverstein | ......... | G06Q 30/0282 |

(Continued)

FOREIGN PATENT DOCUMENTS

CN    203699123 U  *  7/2014
CZ         31245 U1    11/2017

(Continued)

OTHER PUBLICATIONS

Pereira, Alexandre, et al. "A study in virtual navigation cues for forklift operators." 2016 XVIII Symposium on Virtual and Augmented Reality (SVR). IEEE, 2016. (Year: 2016).*

*Primary Examiner* — Nathan A Mitchell
(74) *Attorney, Agent, or Firm* — NK Patent Law

(57) ABSTRACT

Disclosed herein are methods, devices, and systems for improving efficiency of operators of powered industrial trucks (PITs) during material handling. According to one embodiment, a method is implemented on a localized computing system mechanically coupled with a PIT. The method includes providing map overlay data to a human machine interface (HMI) communicatively coupled with the localized computing system; receiving, over a wireless network, pickup location data for an item, and drop-off location data for the item; receiving current location data associated with the PIT; and providing display relative pickup location data, display relative drop-off location, and current location data to the HMI.

16 Claims, 14 Drawing Sheets

(56) References Cited

U.S. PATENT DOCUMENTS

| | | | |
|---|---|---|---|
| 2023/0042965 A1* | 2/2023 | Eckman | G06T 7/70 |
| 2023/0092401 A1* | 3/2023 | Plummer | G06K 7/10722 |
| | | | 235/462.41 |
| 2023/0174358 A1* | 6/2023 | Murli | G01S 17/93 |

FOREIGN PATENT DOCUMENTS

| | | |
|---|---|---|
| CZ | 31246 U1 | 11/2017 |
| CZ | 32010 U1 | 8/2018 |
| CZ | 32065 U1 | 9/2018 |
| CZ | B5327 U1 | 8/2021 |
| JP | 6292645 B1 * | 3/2018 |

\* cited by examiner

GUI
1200

PIT OPERATOR PERFORMANCE

9:00 AM

| Associate | Put-Aways | Pick-to-Stage | Pick-to-Load | Moves | Replens | Stage-To-Load | Total | Incidental | Hrs | Palts/Hr |
|---|---|---|---|---|---|---|---|---|---|---|
| stevenb | 25 | 0 | 0 | 3 | 0 | 0 | 28 | 4 | 1 | 28 |
| jmorris | 16 | 0 | 0 | 11 | 0 | 0 | 27 | 1 | 1 | 27 |
| thomaine | 3 | 0 | 0 | 18 | 0 | 0 | 21 | 2 | 1 | 21 |
| jwatts | 0 | 0 | 0 | 10 | 0 | 0 | 10 | 1 | 1 | 10 |
| Sub-Total | 44 | 0 | 0 | 42 | 0 | 21 | 107 | 34 | 5 | 21.4 |

10:00 AM

| Associate | Put-Aways | Pick-to-Stage | Pick-to-Load | Moves | Replens | Stage-To-Load | Total | Incidental | Hrs | Palts/Hr |
|---|---|---|---|---|---|---|---|---|---|---|
| jmorris | 35 | 0 | 0 | 35 | 0 | 0 | 70 | 0 | 1 | 70 |
| thomaine | 38 | 0 | 0 | 14 | 0 | 0 | 52 | 10 | 1 | 52 |
| jamesp | 0 | 0 | 0 | 0 | 0 | 4 | 4 | 5 | 0.1 | 40 |
| stevenb | 0 | 0 | 7 | 0 | 0 | 9 | 16 | 19 | 1 | 16 |
| ssa | 0 | 0 | 0 | 0 | 0 | 0 | 3 | 0 | 0.9 | 3.3 |
| jwatts | 0 | 0 | 0 | 2 | 0 | 0 | 2 | 4 | 1 | 2 |
| Sub-Total | 73 | 0 | 7 | 51 | 0 | 13 | 147 | 38 | 5 | 29.4 |

FIG. 12

METHODS, DEVICES, AND SYSTEMS FOR IMPROVING MATERIAL HANDLER EFFICIENCY

TECHNICAL FIELD

The disclosures herein relate to material handling using powered industrial trucks (PITs) and more specifically improving efficiency of operators of PITs. PITs may include forklifts, pickers, reach trucks, pallet trucks, and stackers.

BACKGROUND

The Occupational Safety and Health Administration (OSHA) Powered Industrial Truck (PIT) standard, 29 CFR § 1910.178 defines a PIT as any mobile, power-propelled truck used to carry, push, pull, lift, stack, or tier materials, whether ridden by an operator or controlled by a walking operator. One example of a PIT is a forklift. Some industry reports anticipate the global market for forklifts alone to grow from $51 billion in 2021 to over $56 billion in 2022, and that the market may top over $78 billion in 2026.

PITs are found in many industries to move materials from one location to another. However, tracking and managing efficiency of PITs within these industries can be difficult. Operators do not always know where materials are initially located or where their destination may be located. Additionally, materials can be misplaced by operators during movement. Determining which operators are operating efficiently and how efficiently can be very subjective. Such errors and inefficiencies can make materials difficult to locate and possibly require additional operator shifts and/or equipment for correction.

Accordingly, there remains a need for improved methods, devices, and systems for improving efficiency of operators of PITs during material handling.

SUMMARY

Disclosed herein are methods, devices, and systems for improving efficiency of operators of powered industrial trucks (PITs) during material handling. According to one embodiment, a method is implemented on a localized computing system mechanically coupled with a PIT. The method includes (1) providing map overlay data to a human machine interface (HMI) communicatively coupled with the localized computing system; (2) receiving, over a wireless network, pickup location data for an item; (3) receiving, over the wireless network, drop-off location data for the item; (4) receiving current location data associated with a powered industrial truck (PIT); and (4) providing display relative pickup location data to the HMI. The display relative pickup location data is associated with the pickup location data and the map overlay data.

The method further includes (5) providing display relative drop-off location data to the HMI. The display relative drop-off location data is associated with the drop-off location data and the map overlay data. The method further includes (6) providing display relative current location data to the HMI. The display relative current location data is associated with the current location data and the map overlay data. The HMI is mechanically coupled with the PIT and configured to be accessible to an operator of the PIT. The HMI is further configured to display a first graphical user interface (GUI) based on the map overlay data, the display relative pickup location data, the display relative drop-off location data, the display relative current location data. The method further includes (7) receiving first operator input data from the HMI. The first operator input data is indicative of the operator of the PIT viewing a first GUI.

In some embodiments, the PIT may be a forklift, a picker, a reach truck, a pallet truck, a stacker, or the like.

In some embodiments, the wireless network may be a wireless local area network (WLAN). The WLAN may also be an industrial Wi-Fi network. In further embodiments, the WLAN may be compliant to at least one version of an 802.11 standard. On other embodiments, the wireless network may be a cellular network. In further embodiments, the cellular network may be compliant with 2G. 3G, 4G, and/or 5G technologies networks. In some embodiments, the wireless network may be communicatively coupled with the Internet.

In some embodiments, the current location data may be determined via a Light Detection and Ranging (LIDAR) system and the LIDAR system may be mechanically coupled with the PIT. In other embodiments, the current location data may be received from a global navigation satellite system (GNSS) receiver. In other embodiments, the current location data may be received over the wireless network from an external to the PIT positioning system.

In some embodiments, the map overlay data may be received over the wireless network.

In some embodiments, the map overlay data may be associated with physical structures of a manufacturing facility, a storage facility, and/or the like. The storage facility may be an indoor storage facility and/or an outdoor storage facility.

In some embodiments the method may further include transmitting the current location data over the wireless network to a remote computing system. In further embodiments, the remote computing system may be configured to monitor a plurality of PITs.

In some embodiments the method may further include receiving current height data from a height sensor positioned on the PIT and transmitting at least a portion of the current height data over the wireless network to the remote computing system. The current height data may be associated with a current height of forks on the PIT. In further embodiments, the height sensor may be a draw-wire encoder.

In some embodiments the method may further include receiving current weight data from a weight sensor and transmitting at least a portion of the current weight data over the wireless network to the remote computing system. The current weight data may be associated with a pickup procedure and/or a drop-off procedure of the item.

In some embodiments the method may further include receiving current scanned data from a scanner sensor and transmitting at least a portion of the current scanned data over the wireless network to the remote computing system. The current scanned data may be associated a pickup procedure and/or a drop-off procedure of the item. In further embodiments, the scanner sensor may be a radio-frequency identification (RFID) scanner sensor, a barcode scanner sensor, a quick response (QR) code scanner sensor, and/or the like.

In some embodiments the method may further include receiving a first message via the wireless network indicating at least one of a successful pickup and an unsuccessful pickup of the item; and providing to the HMI, upon receiving the first message, a first indication of the successful pickup or the unsuccessful pickup. The successful pickup may be determined based at least partially on the pickup location data, the drop-off location data, the current location data, the current height data, the current weight data, and/or the current scanned data. The unsuccessful pickup may be determined based at least partially on the pickup location data, the drop-off location data, the current location data, the current height data, the current weight data, and/or the current scanned data.

In some embodiments the method may further include receiving a second message via the wireless network indicating at least one of a successful drop-off and an unsuccessful drop-off of the item; and providing to the HMI, upon receiving the second message, a second indication viewable to the operator the successful drop-off or the unsuccessful drop-off. The successful drop-off may be determined based at least partially on the pickup location data, the drop-off location data, the current location data, the current height data, the current weight data, and/or the current scanned data. The unsuccessful drop-off may be determined based at least partially on the pickup location data, the drop-off location data, the current location data, the current height data, the current weight data, and/or the current scanned data.

In some embodiments, the remote computing system may be configured to determine an efficiency value associated with the operator based at least partially on a delta time between the successful pickup and the successful drop-off.

In some embodiments, the remote computing system may be configured to determine an efficiency value associated with the operator based at least partially on at least one of the unsuccessful pickup and the unsuccessful drop-off.

In some embodiments, the PIT may be one of a plurality of PITs communicatively coupled with the remote computing system over the wireless network. In further embodiments, the operator may be one of a plurality of operators associated with the plurality of PITs. In further embodiments, the remote computing system may be configured to determine an efficiency value of each of the plurality of operators based at least partially on a delta time between a successful pickup and a successful drop-off. In further embodiments, the efficiency value may be further determined on each of the plurality of operators based at least partially on a number of successful pickups, a number of unsuccessful pickups, a number of successful drops, a number of unsuccessful drop-offs, and/or the like.

In some embodiments the method may further include transmitting a unique operator identification (ID) associated with the operator. In further embodiments, the unique operator ID may be received from at least one of the HMI and the scanner sensor.

In some embodiments, the method may further include providing display relative route data to the HMI and the first GUI may be further based on the display relative route data. In further embodiments, the method may further include determining the display relative route data based on the map overlay data, the pickup location data, and the drop-off location data. In other embodiments, the map overlay data may include the display relative route data.

In some embodiments, the PIT may be a previously assembled fully operator functional PIT. In further embodiments, the localized computing system, the height sensor, the weight sensor, and the scanning sensor may be configured to be installed on the previously assembled fully operator functional PIT.

In another embodiment, a localized computing system is disclosed for improving material handler efficiency. The localized computing system includes one or more processors, one or more memories electrically coupled with the one or more processor, and program instructions stored in the one or more memories. The program instructions when executed by the one or more processors perform a method. The method includes (1) providing map overlay data to an HMI communicatively coupled with the localized computing system; (2) receiving, over a wireless network, pickup location data for an item; (3) receiving, over the wireless network, drop-off location data for the item; (4) receiving current location data associated with a PIT; and (4) providing display relative pickup location data to the HMI. The display relative pickup location data is associated with the pickup location data and the map overlay data.

The method further includes (5) providing display relative drop-off location data to the HMI. The display relative drop-off location data is associated with the drop-off location data and the map overlay data. The method further includes (6) providing display relative current location data to the HMI. The display relative current location data is associated with the current location data and the map overlay data.

The HMI is mechanically coupled with the PIT and configured to be accessible to an operator of the PIT. The HMI is further configured to display a first GUI based on the map overlay data, the display relative pickup location data, the display relative drop-off location data, the display relative current location data. The method further includes (7) receiving first operator input data from the HMI. The first operator input data is indicative of the operator of the PIT viewing a first GUI.

In another embodiment, a non-transitory computer-readable storage medium storing program instructions to be implemented on a localized computing system that includes one or more processors. the program instructions when executed by the one or more processors cause the localized computing system to perform a method for improving efficiency of PITs during material handling. The method includes (1) providing map overlay data to an HMI communicatively coupled with the localized computing system; (2) receiving, over a wireless network, pickup location data for an item; (3) receiving, over the wireless network, drop-off location data for the item; (4) receiving current location data associated with a PIT; and (4) providing display relative pickup location data to the HMI. The display relative pickup location data is associated with the pickup location data and the map overlay data.

The method further includes (5) providing display relative drop-off location data to the HMI. The display relative drop-off location data is associated with the drop-off location data and the map overlay data. The method further includes (6) providing display relative current location data to the HMI. The display relative current location data is associated with the current location data and the map overlay data.

The HMI is mechanically coupled with the PIT and configured to be accessible to an operator of the PIT. The HMI is further configured to display a first GUI based on the map overlay data, the display relative pickup location data, the display relative drop-off location data, the display relative current location data. The method further includes (7) receiving first operator input data from the HMI. The first operator input data is indicative of the operator of the PIT viewing the first GUI (e.g., the operator of the PIT may acknowledge via the first GUI that a pick-up and/or drop-off is complete).

According to another embodiment, a method is implemented on a remote computing system for improving efficiency of operators of PITs during material handling. The method includes receiving, over a wireless network, a plurality of operator IDs associated with a plurality of PITs.

The method further includes receiving, over the wireless net, a plurality of indications for successful pickups, unsuccessful pickups, successful drop-offs, and unsuccessful drop-offs for each operator ID of the plurality of operator IDs for a plurality of items.

The method further includes determining a plurality of efficiency values associated with the plurality of operator IDs based on the plurality of indications for successful pickups, unsuccessful pickups, successful drop-offs, and unsuccessful drop-offs for each operator ID of the plurality of operator IDs for the plurality of items.

The method further includes providing to a first GUI a first graph associated with the plurality of efficiency values and providing to a second GUI a diagram indicating a current location of at least a portion of the plurality of items.

In some embodiments, the plurality of efficiency values may be further determined based on a plurality of transit times associated with the plurality of items, successful pickups, and successful drop-offs.

In some embodiments, the GUI may be displayed on another computing system communicatively coupled with the remote computing system. In further embodiments, the other computing system may be a personal computer (PC), workstation, laptop, smart tablet, smart phone, smart television (TV), or the like.

In another embodiment, a remote computing system is disclosed for improving material handler efficiency. The remote computing system includes one or more processors, one or more memories electrically coupled with the one or more processor, and program instructions stored in the one or more memories. The program instructions when executed by the one or more processors perform a method. The method includes receiving, over a wireless network, a plurality of operator IDs associated with a plurality of PITs.

The method further includes receiving, over the wireless net, a plurality of indications for successful pickups, unsuccessful pickups, successful drop-offs, and unsuccessful drop-offs for each operator ID of the plurality of operator IDs for a plurality of items. The successful pickups, the unsuccessful pickups, the successful drop-offs, and the unsuccessful drop-offs may be determined based at least partially on pickup location data, drop-off location data, current location data, current height data, current weight data, and current scanned data.

The method further includes determining a plurality of efficiency values associated with the plurality of operator IDs based on the plurality of indications for successful pickups, unsuccessful pickups, successful drop-offs, and unsuccessful drop-offs for each operator ID of the plurality of operator IDs for the plurality of items.

The method further includes providing to a first GUI a first graph associated with the plurality of efficiency values and providing to a second GUI a diagram indicating a current location of at least a portion of the plurality of items.

In another embodiment, a non-transitory computer-readable storage medium storing program instructions to be implemented on a remote computing system that includes one or more processors. the program instructions when executed by the one or more processors cause the localized computing system to perform a method for improving efficiency of PITs during material handling. The method includes receiving, over a wireless network, a plurality of operator IDs associated with a plurality of PITs.

The method further includes receiving, over the wireless network, a plurality of indications for successful pickups, unsuccessful pickups, successful drop-offs, and unsuccessful drop-offs for each operator ID of the plurality of operator IDs for a plurality of items.

The method further includes determining a plurality of efficiency values associated with the plurality of operator IDs based on the plurality of indications for successful pickups, unsuccessful pickups, successful drop-offs, and unsuccessful drop-offs for each operator ID of the plurality of operator IDs for the plurality of items.

The method further includes providing to a first GUI a first graph associated with the plurality of efficiency values and providing to a second GUI a diagram indicating a current location of at least a portion of the plurality of items.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 12 depicts another GUI illustrating individual operator performance in accordance with embodiments of the present disclosure.

DETAILED DESCRIPTION

Figure 1:
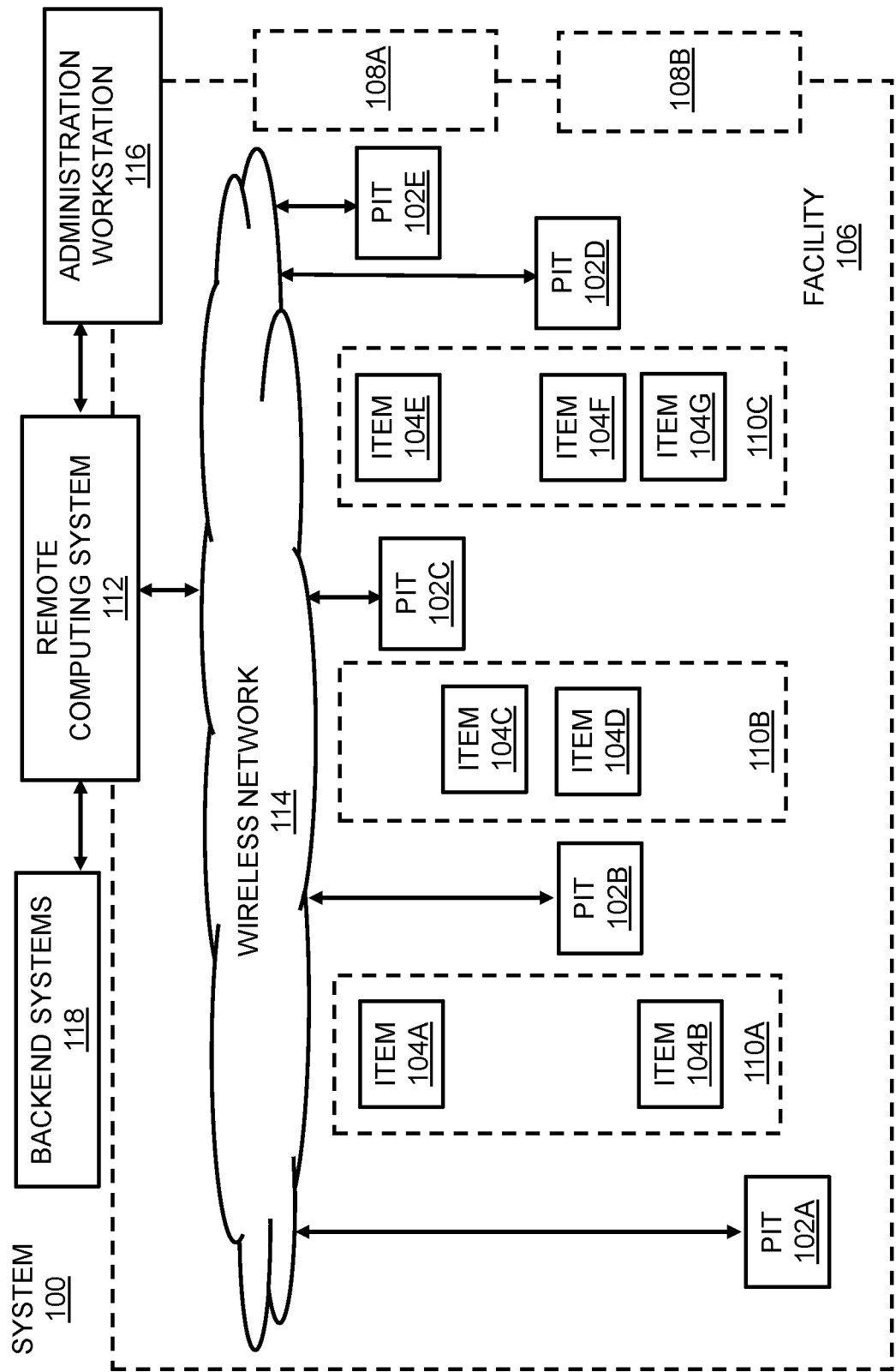
FIG. 1 depicts a block diagram illustrating a system that includes a facility, a remote computing system, an administration workstation, and a plurality of powered industrial trucks (PITs) for moving a plurality of items in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Disclosed herein are methods, devices, and systems for improving efficiency of operators of powered industrial trucks (PITs) during material handling. FIG. 1 depicts a block diagram illustrating a system 100 that includes a plurality of PITs 102A-102E, a plurality of items 104A-104G, a facility 106, an incoming loading dock 108A, an outgoing loading dock 108B, a plurality of storage racks 110A-110C, a remote computing system 112, a wireless network 114, an administration workstation 116, and backend systems 118 in accordance with embodiments of the present disclosure. The plurality of PITs 102A-102E are configured to communicate with the remote computing system 112 over the wireless network 114. The plurality of PITs 102A-102E, using human operators, are also configured to reposition one or more of the plurality of items 104A-104G to different locations on the storage racks 110A-110C, incoming loading dock 108A, and an outgoing loading dock 108B. The PITs may include one or more of forklifts, pickers, reach trucks, pallet trucks, stackers, or the like.

The remote computing system 112 may be located within facility 106, within a localized campus associated with the facility 106, or within a remote cloud computing facility.

The backend systems 118 may include an Enterprise Resource Planning (ERP) system. The ERP system may be configured to manage business activities of the facility 106 on a daily basis. The business activities may include procurement services, human resources activities, finance services, manufacturing, supply chain activities, or the like.

The wireless network 114 may be a wireless local area network (WLAN) and may be compliant to at least one version of an 802.11 standard. In other embodiments, the wireless network 114 may be a cellular network and may be compliant with 2G, 3G, 4G, and/or 5G technologies networks. The wireless network may also be communicatively coupled with the Internet (e.g., when the remote computing system 112 is located within a remote cloud computing facility).

In typical operation, the remote computer system 112 pings the ERP system for an order (including an item such as one of items 104A-104G). The order may be initiated by a customer within the facility 106 or external to the facility 106. The ERP system provides the order including a pickup location and a drop-off location within the facility 106 for the order. The remote computer system 112 processes the order and sends information over the network 114 to a PIT of PITs 102A-102E. The information is provided via a graphical user interface (GUI) on a human machine interface (HMI) fixed on the PIT and viewable to an operator of the PIT. The operator then drives the PIT to the pickup location via the GUI. The item and/or the current location is manually or automatically scanned at the pickup location to obtain scanned pickup location data. The scanned pickup location data is sent over the network 114 to the remote computing system 112. The operator then drives the PIT including the item to the drop-off location via the GUI displayed on the HMI. The GUI displays the current location of the PIT in near real-time. The item and/or the current location is manually or automatically scanned at the drop-off location to obtain scanned drop-off location data. The scanned drop-off location data is sent over the network 114 to the remote computing system 112. The scanned pickup location data and scanned drop-off location data is then processed by the remote computing system 112 to determine if the order was successful processed by the operator of the PIT and how efficiently the order was processed. Additional orders, may be processed in a similar manner by other operators of PITs 102A-102E using the system 100.

Figure 2:
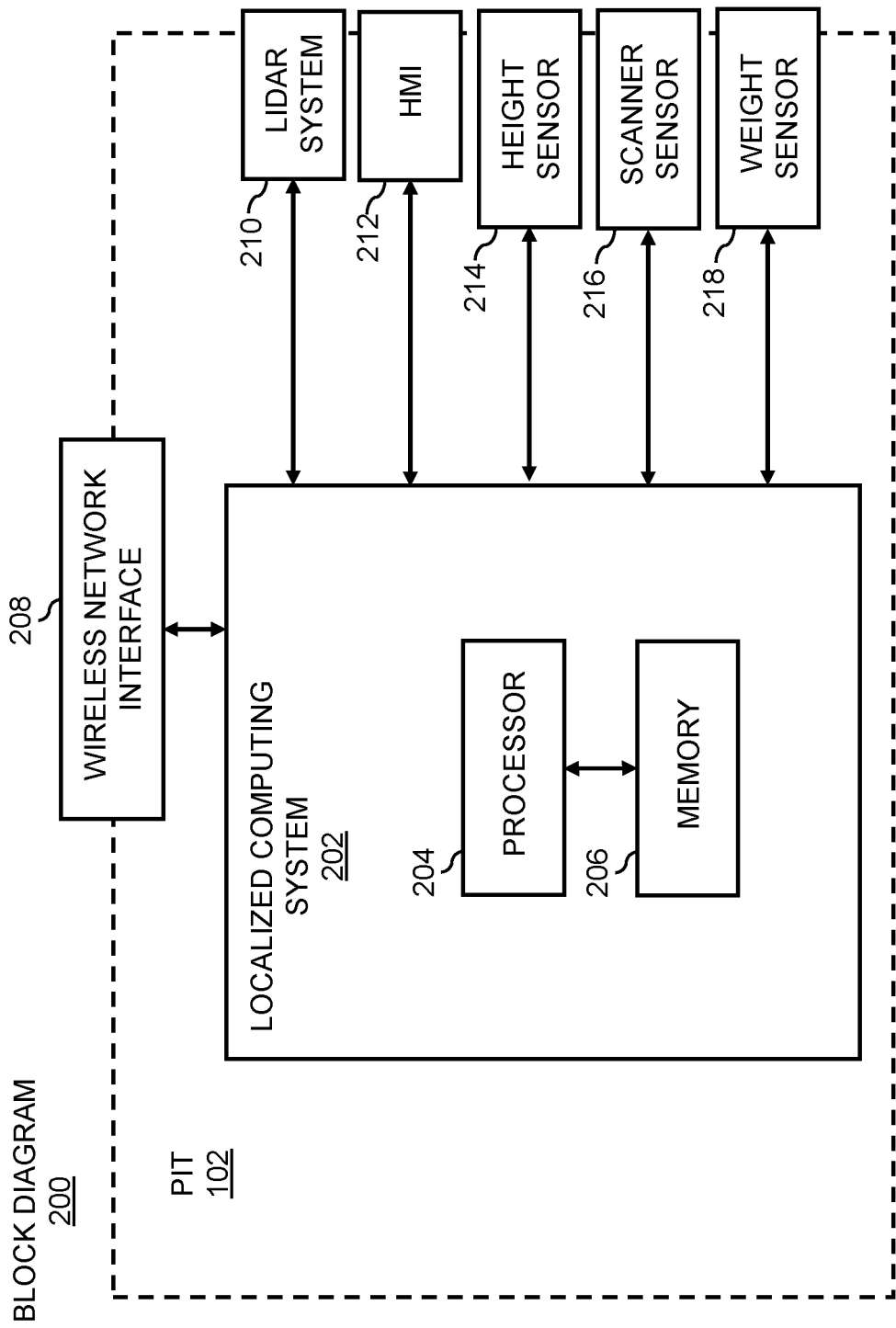
FIG. 2 depicts a block diagram illustrating a PIT of the plurality of PITs of FIG. 1 in accordance with embodiments of the present disclosure.

FIG. 2 depicts a block diagram illustrating a PIT 102 of the plurality of PITs 102A-102E of FIG. 1 in accordance with embodiments of the present disclosure. The PIT 102 includes a localized computing system 202 that includes at least one processor 204 and a memory 206. The localized computing system 202 is communicatively coupled with a wireless network interface 208, a Light Detection and Ranging (LIDAR) system 210, an HMI 212, a height sensor 214, a scanner sensor 216, and a weight sensor 218. The localized computing system 202 may include an industrial personal computer (IPC).

The scanner sensor 216 may include a Radio Frequency IDentification (RFID) reader fixed to the PIT 102. The scanner sensor may also include a handheld scanner. The handheld scanner may be wirelessly coupled with the localized computing system 202. The handheld scanner may include also include an RFID reader, a barcode scanner, a quick response (QR) code scanner, and/or the like.

The LIDAR system 210 may include a two-dimensional (2D) lidar sensor. In other embodiments, the LIDAR system 210 may include a three-dimensional (3D) lidar sensor.

The weight sensor 218 may be part of a hydraulic sensor system (not shown in FIG. 2) of the PIT 102. In other embodiments, the weight sensor 218 may be mounted between a carriage and forks on the PIT 102.

An industrial Ethernet switch (not shown in FIG.) may be used to communicatively couple the localized computing system 202 with the wireless network interface 208, the LIDAR system 210, the HMI 212, the height sensor 214, the scanner sensor 216, and the weight sensor 218.

Other common PIT components are not shown in FIG. 2 (e.g., truck frame, counterweight, operator cab, power source including engine/battery compartment, mast, lift/tilt cylinder, carriage, load backrest, steer axle, drive axle, tires, overhead guard, forks, lights, horn, steering wheel, rating plate, etc.).

The system 100 allows for efficient usage of the facility 106 while making sure items are located in their proper places within the facility 106. The system 100 helps to reduce errors made by operators and increases overall productivity. As such, less PITs and operators may be needed. The system 100 further reduces new operator training time and helps to decrease operator anxiety by giving them more confidence where to pickup and drop off items. Maintenance is improved by knowing more details on PIT usage.

Figure 3:
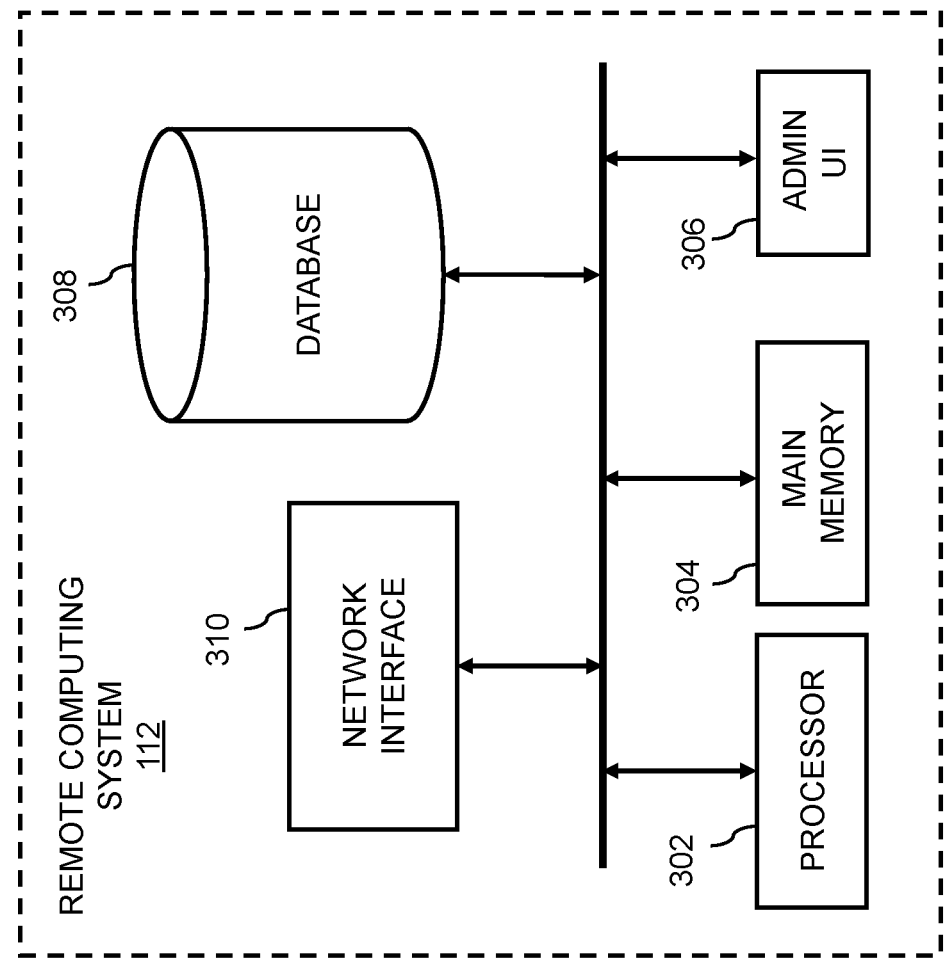
FIG. 3 depicts a block diagram illustrating one embodiment of the remote computing system of FIG. 1 in accordance with embodiments of the present disclosure.

FIG. 3 depicts a block diagram 300 illustrating one embodiment of the remote computing system 112 of FIG. 1 in accordance with embodiments of the present disclosure.

The remote computing system 112 includes at least one processor 302, a main memory 304, an administration user interface (UI) 306 a storage memory (e.g., database) 308, and a network interface 310. The remote computing system 112 may be configured to host an Ubuntu® server or the like. In some embodiments, the Ubuntu® server may be distributed over a plurality of hardware servers using hypervisor technology.

The processor 302 may be a multi-core server class processor suitable for hardware virtualization. The processor may support at least a 64-bit architecture and a single instruction multiple data (SIMD) instruction set. The main memory 304 may include a combination of volatile memory (e.g. random access memory) and non-volatile memory (e.g. flash memory). The database 308 may include one or more hard drives.

The network interface 310 may provide one or more high-speed communication ports to data center switches, routers, and/or network storage appliances. The network interface 708 may include high-speed optical Ethernet, InfiniBand (IB), Internet Small Computer System Interface (iSCSI), and/or Fibre Channel interfaces. The administration UI may support local and/or remote configuration of the remote computing system 112 by a datacenter administrator.

Figure 4:
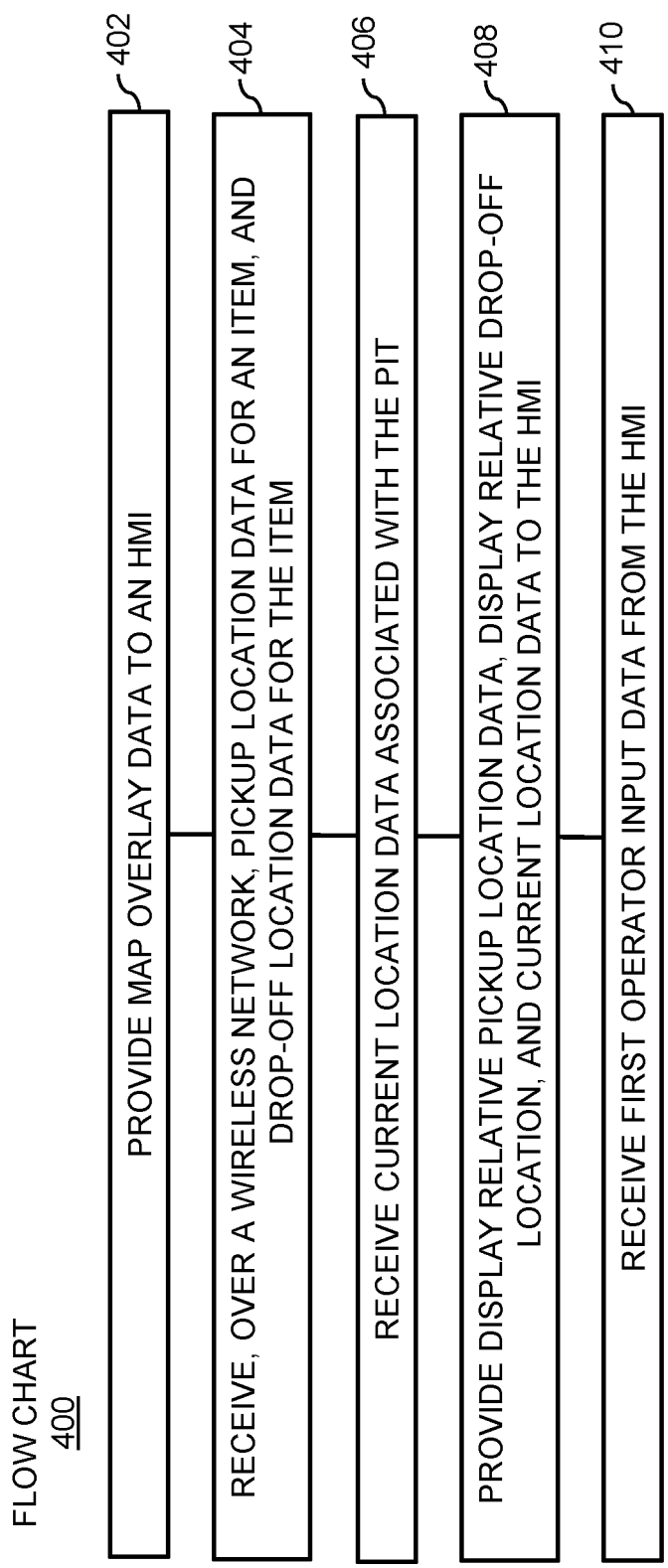
FIG. 4 depicts a flowchart illustrating a method implemented on a computing system positioned on a PIT (e.g., the PIT of FIG. 2) in accordance with embodiments of the present disclosure.

FIG. 4 depicts a flowchart 400 illustrating a method implemented on a computing system positioned on a PIT (e.g., the localized computing system 202 of FIG. 2) in accordance with embodiments of the present disclosure.

In step 402, the method includes providing map overlay data to an HMI.

In step 404, the method includes receiving, over a wireless network, pickup location data for an item, and drop-off location data for the item.

In step 406, the method includes receiving current location data associated with the PIT.

In step 408, the method includes providing display relative pickup location data, display relative drop-off location, and current location data to the HMI.

In step 410, the method includes receiving first operator input data from the HMI.

Figure 5:
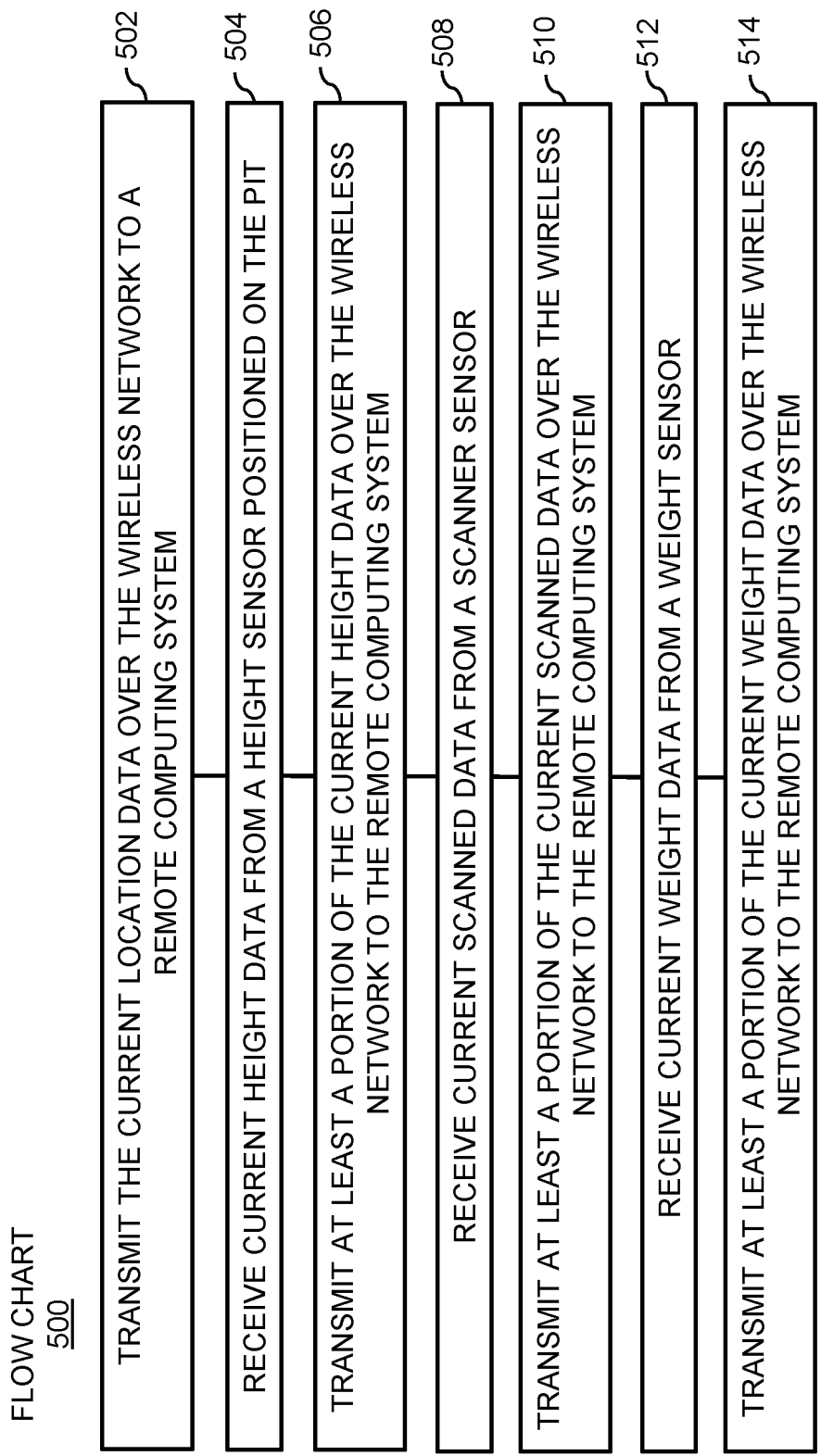
FIG. 5 depicts another flowchart illustrating additional steps for the method of FIG. 4 in accordance with embodiments of the present disclosure.

FIG. 5 depicts flowchart 500 illustrating additional steps for the method of flowchart 400 of FIG. 4 in accordance with embodiments of the present disclosure.

In step 502, the method further includes transmitting the current location data over the wireless network to a remote computing system.

In step 504, the method further includes receiving current height data from a height sensor positioned on the PIT.

In step 506, the method further includes transmitting at least a portion of the current height data over the wireless network to the remote computing system.

In step 508, the method further includes receiving current scanned data from a scanner sensor.

In step 510, the method further includes transmitting at least a portion of the current scanned data over the wireless network to the remote computing system.

In step 512, the method further includes receiving current weight data from a weight sensor.

Figure 6:
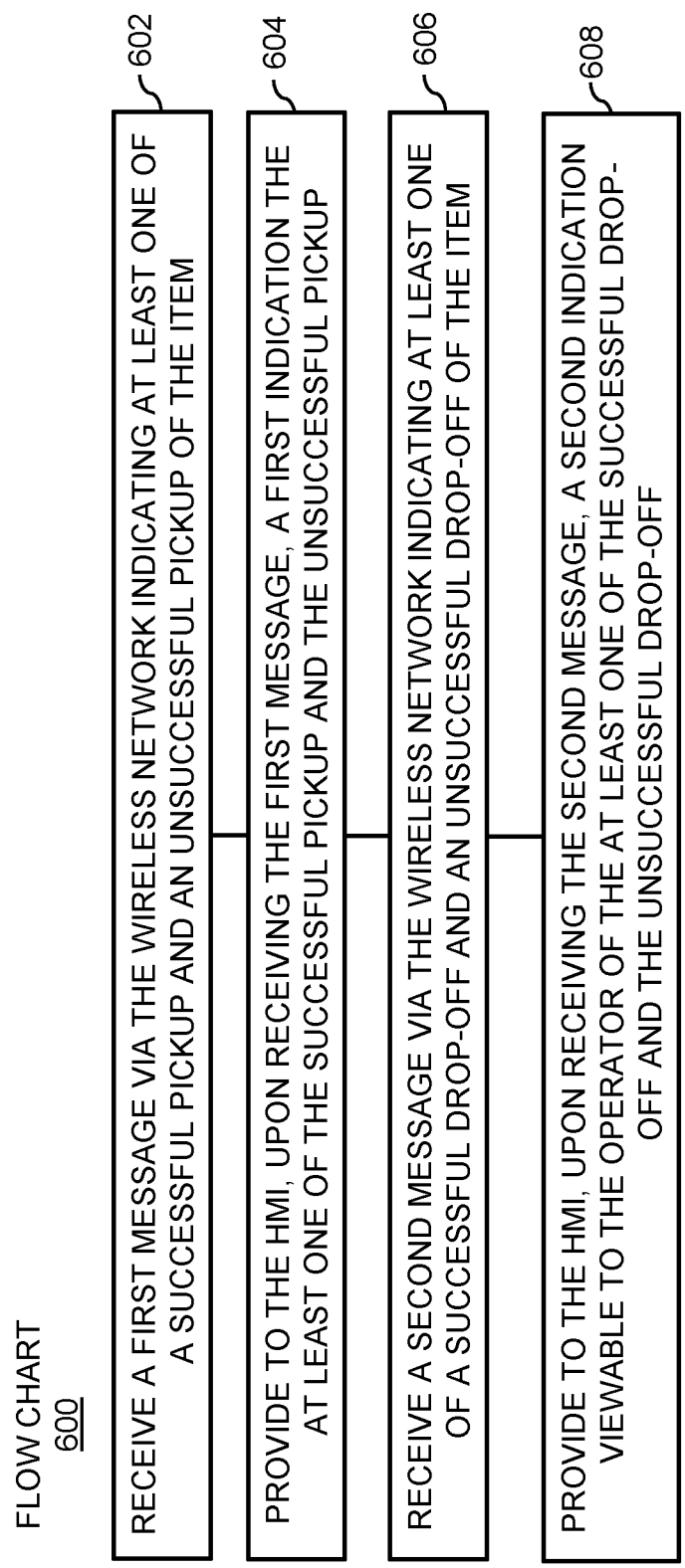
FIG. 6 depicts another flowchart illustrating additional steps for the method of FIG. 4 and FIG. 5 in accordance with embodiments of the present disclosure.

In step 514, the method further includes transmitting at least a portion of the current weight data over the wireless network to the remote computing system FIG. 6 depicts flowchart 600 illustrating additional steps for the method of flowchart 400 of FIG. 4 and the method of flowchart 500 of FIG. 5 in accordance with embodiments of the present disclosure.

In step 602, the method further includes receiving a first message via the wireless network indicating at least one of a successful pickup and an unsuccessful pickup of the item.

In step 604, the method further includes providing to the HMI, upon receiving the first message, a first indication the at least one of the successful pickup and the unsuccessful pickup.

In step 606, the method further includes receiving a second message via the wireless network indicating at least one of a successful drop-off and an unsuccessful drop-off of the item.

Figure 7:
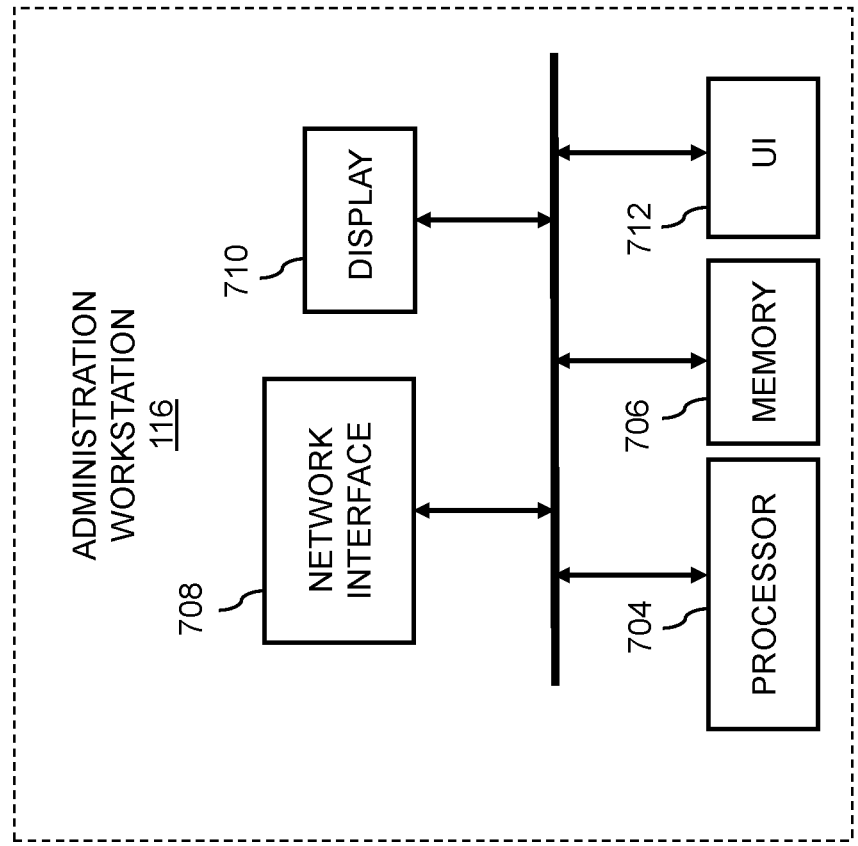
FIG. 7 depicts a block diagram illustrating one embodiment of the administration workstation of FIG. 1 in accordance with embodiments of the present disclosure.

In step 608, the method further includes providing to the HMI, upon receiving the second message, a second indication viewable to the operator of the at least one of the successful drop-off and the unsuccessful drop-off FIG. 7 depicts a block diagram 700 illustrating one embodiment of the administration workstation 116 of FIG. 1 in accordance with embodiments of the present disclosure.

The administration workstation 116 includes at least one processor 704, at least one memory 706, a network interface 708, at least one display 710, and a user interface (UI) 712. In certain embodiments, the administration workstation 116 may be a "workstation class" computing device. The processor 704 may be an Intel core i9-10900K desktop processor or the like. The memory 706 may include a combination of volatile memory (e.g., random access memory) and non-volatile memory (e.g., flash memory). The memory 706 may be partially integrated with the processor 704. The UI 712 may include a keyboard. The UI 712 may also include a mouse, a touchpad, and/or the like. In certain embodiments, the UI 712 may be integrated with the display 710. The display 710 may be a separate display or may be integrated with the other components (e.g., a laptop).

The administration workstation 116 may include an operating system (OS) to run a web based application. The operating system (OS) may be a Windows® OS, a Macintosh® OS, a Linux® OS, or the like. The network interface 708 may be a wired Ethernet interface or a Wi-Fi interface. The Wi-Fi interface may be configured to communicate of the wireless network 114 of FIG. 1. The administration workstation 116 may be configured to access remote memory (e.g., network storage and/or cloud storage) via the network interface 708. In other embodiments, the administration workstation 116 may be a personal computer (PC), a laptop, a smart TV, a smart tablet, or the like.

Figure 8:
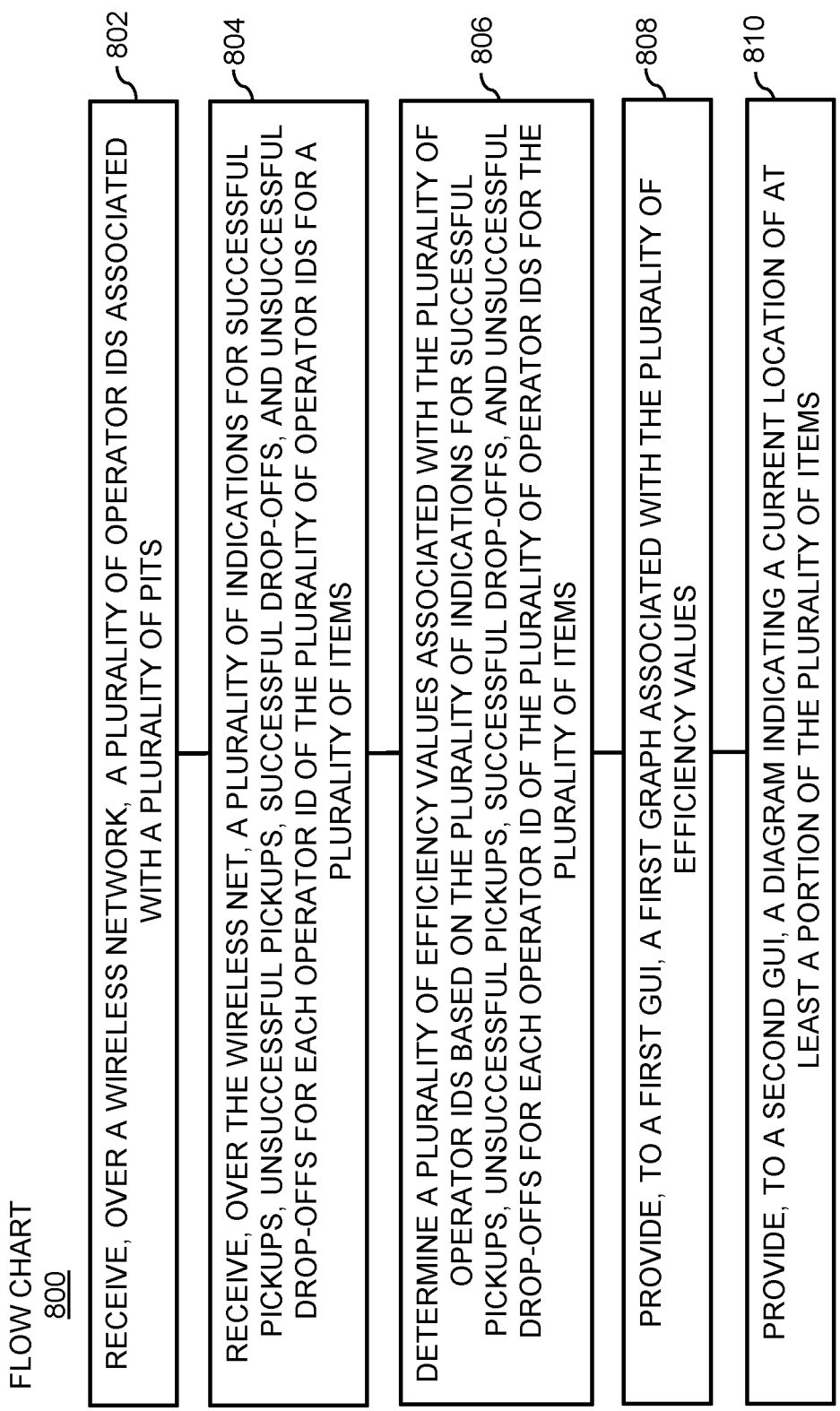
FIG. 8 depicts a flowchart illustrating a method performed on a computing system (e.g., the remote computing system of FIG. 1) for improving efficiency of operators of PITs during material handling in accordance with embodiments of the present disclosure.

FIG. 8 depicts a flowchart 800 illustrating a method performed on a computing system (e.g., the remote computing system 112 of FIG. 1) for improving efficiency of operators of PITs during material handling in accordance with embodiments of the present disclosure.

In step 802, the method includes receiving, over a wireless network, a plurality of operator identifiers (IDs) associated with a plurality of PITS.

In step 804, the method further includes receiving, over the wireless net, a plurality of indications for successful pickups, unsuccessful pickups, successful drop-offs, and unsuccessful drop-offs for each operator id of the plurality of operator ids for a plurality of items.

In step 806, the method further includes determining a plurality of efficiency values associated with the plurality of operator ids based on the plurality of indications for successful pickups, unsuccessful pickups, successful drop-offs, and unsuccessful drop-offs for each operator id of the plurality of operator ids for the plurality of items.

In step 808, the method further includes providing, to a first GUI, a first graph associated with the plurality of efficiency values.

In step 810, the method further includes providing, to a second GUI, a diagram indicating a current location of at least a portion of the plurality of items.

FIG. 9 through FIG. 14 depict a plurality of GUIs that may be presented on the administration workstation 116 of FIG. 1 and FIG. 7 in conjunction with the method of FIG. 8 and other methods in accordance with embodiments of the present disclosure.

Figure 9:
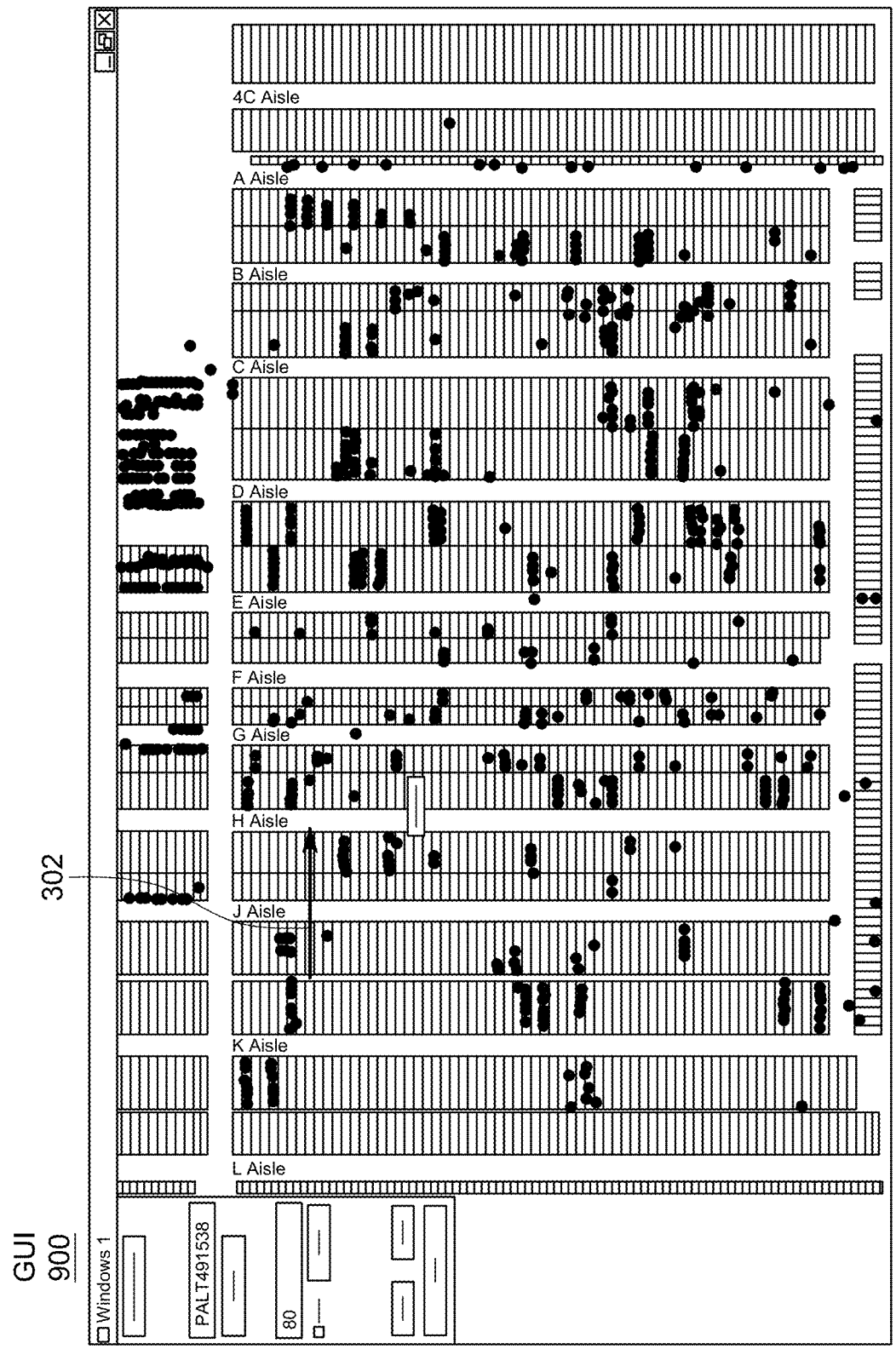
FIG. 9 depicts a graphical user interface (GUI) illustrating a diagram for locating one or more items within a facility in accordance with embodiments of the present disclosure.

FIG. 9 depicts a GUI 900 illustrating a diagram for locating one or more items within a facility in accordance with embodiments of the present disclosure. An arrow 302 indicates a location of an item.

Figure 10:
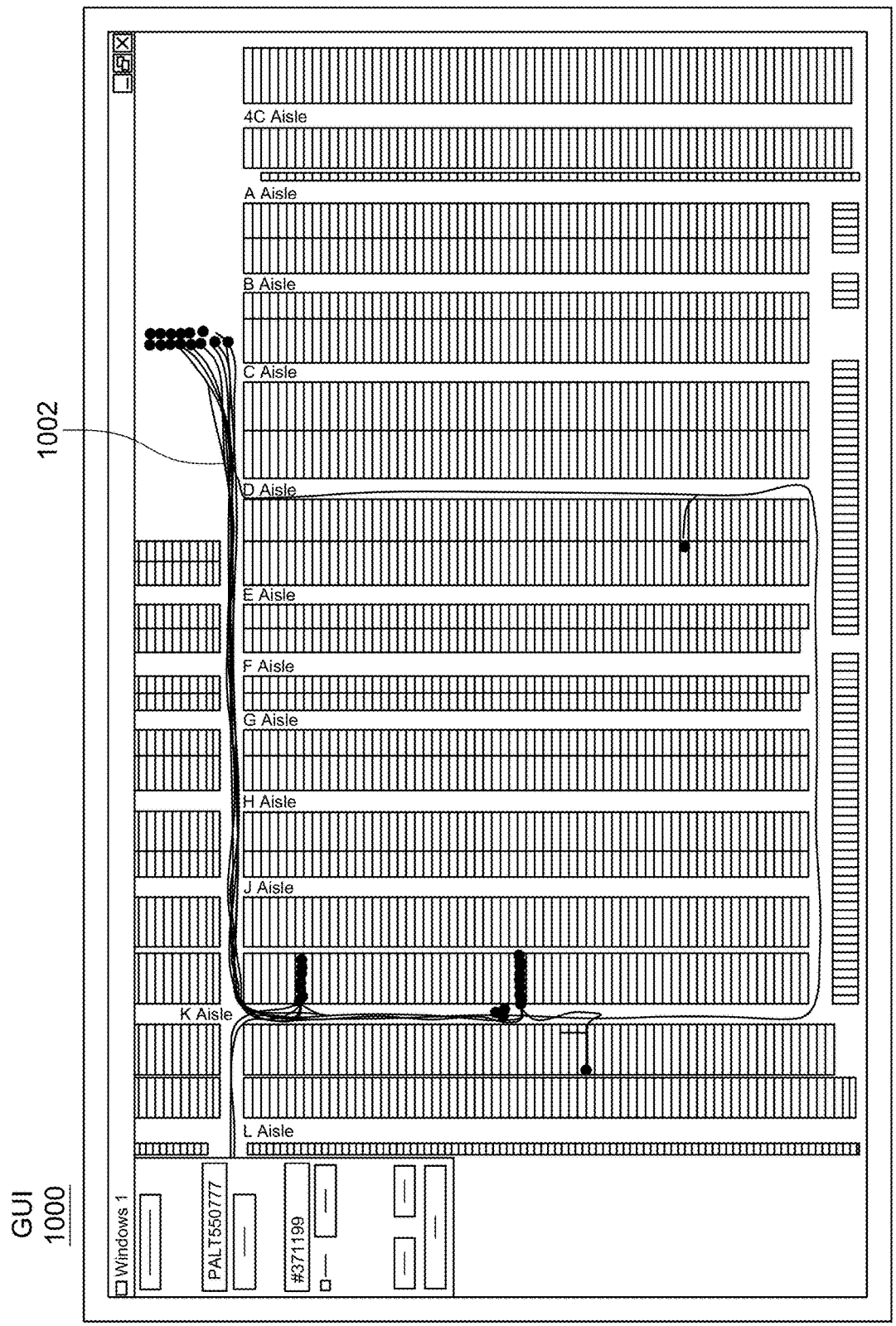
FIG. 10 depicts another GUI illustrating routes of operators of PITs within a facility in accordance with embodiments of the present disclosure.

FIG. 10 depicts an GUI 1000 illustrating a plurality of routes 302 of taken by operators of PITs while moving items within a facility in accordance with embodiments of the present disclosure.

Figure 11:
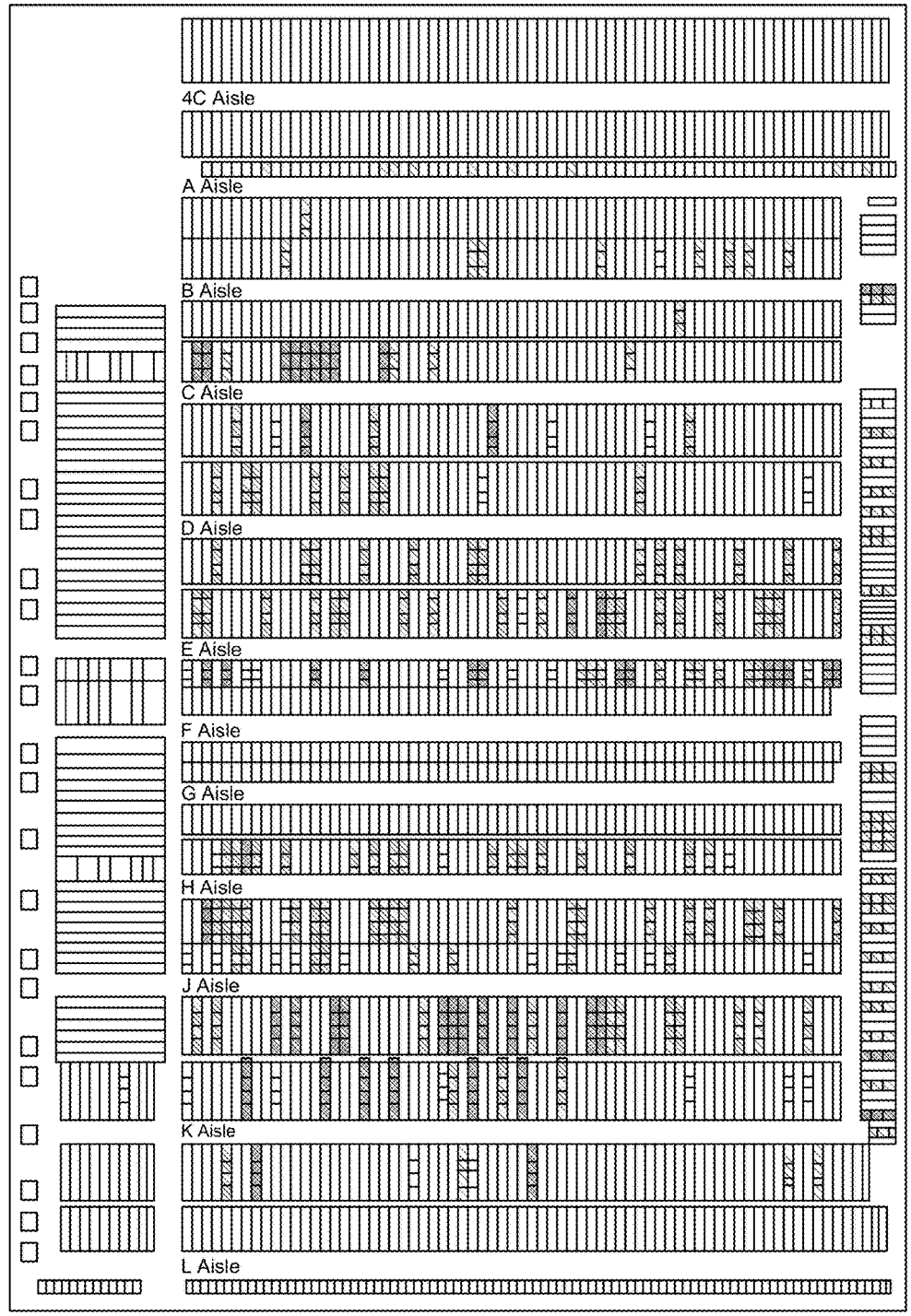
FIG. 11 depicts another GUI illustrating locations of high runner items and low runner items within a facility in accordance with embodiments of the present disclosure.in accordance with embodiments of the present disclosure.

FIG. 11 depicts a GUI 1100 illustrating locations of high runner items and low runner items within a facility in accordance with embodiments of the present disclosure.

FIG. 12 depicts a GUI 1200 illustrating individual PIT operator performance of different activities associated with material handling in accordance with embodiments of the present disclosure.

Figure 13:
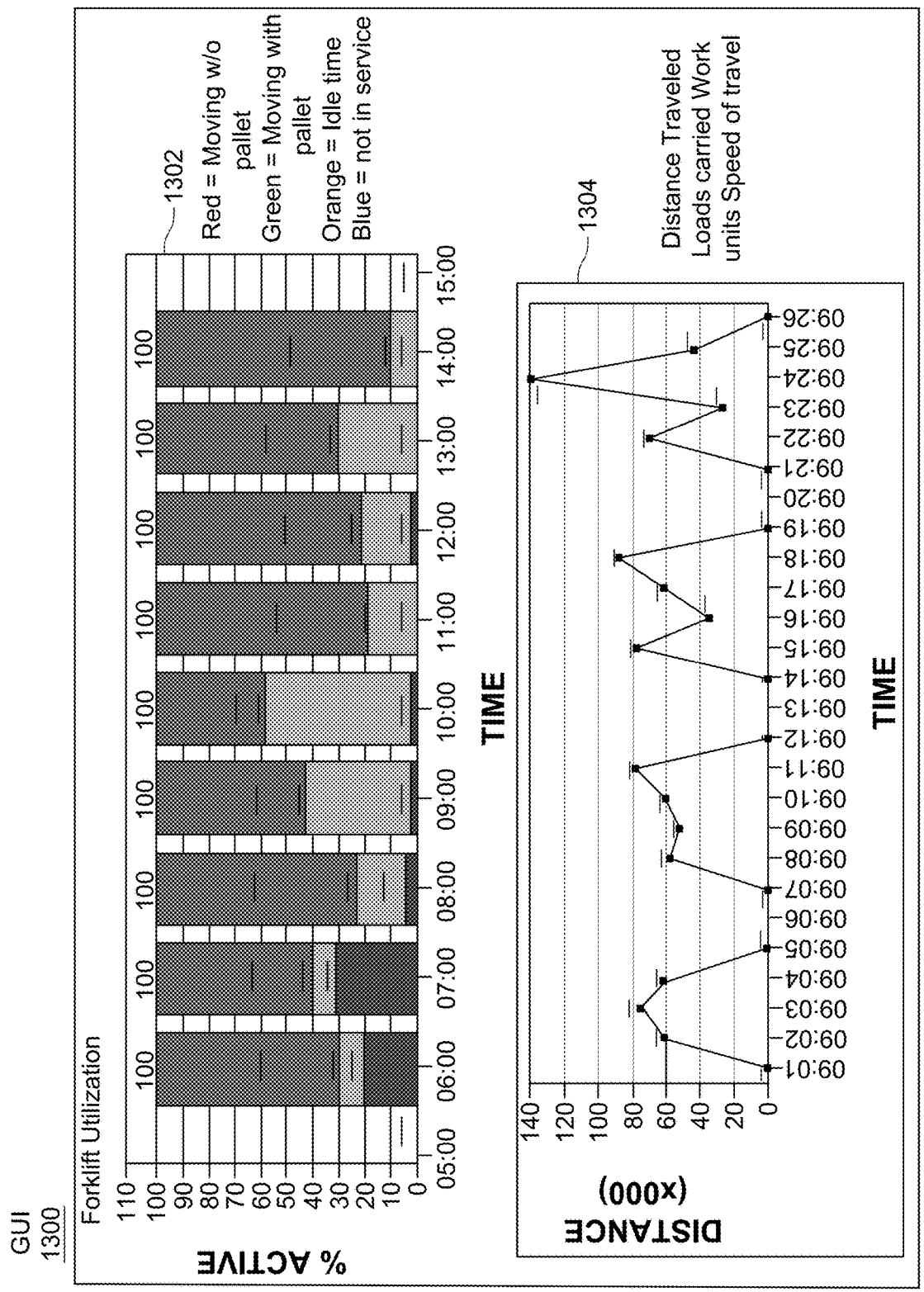
FIG. 13 depicts another GUI of two graphs illustrating performance over time of a plurality of PITs in accordance with embodiments of the present disclosure.
Figure 14:
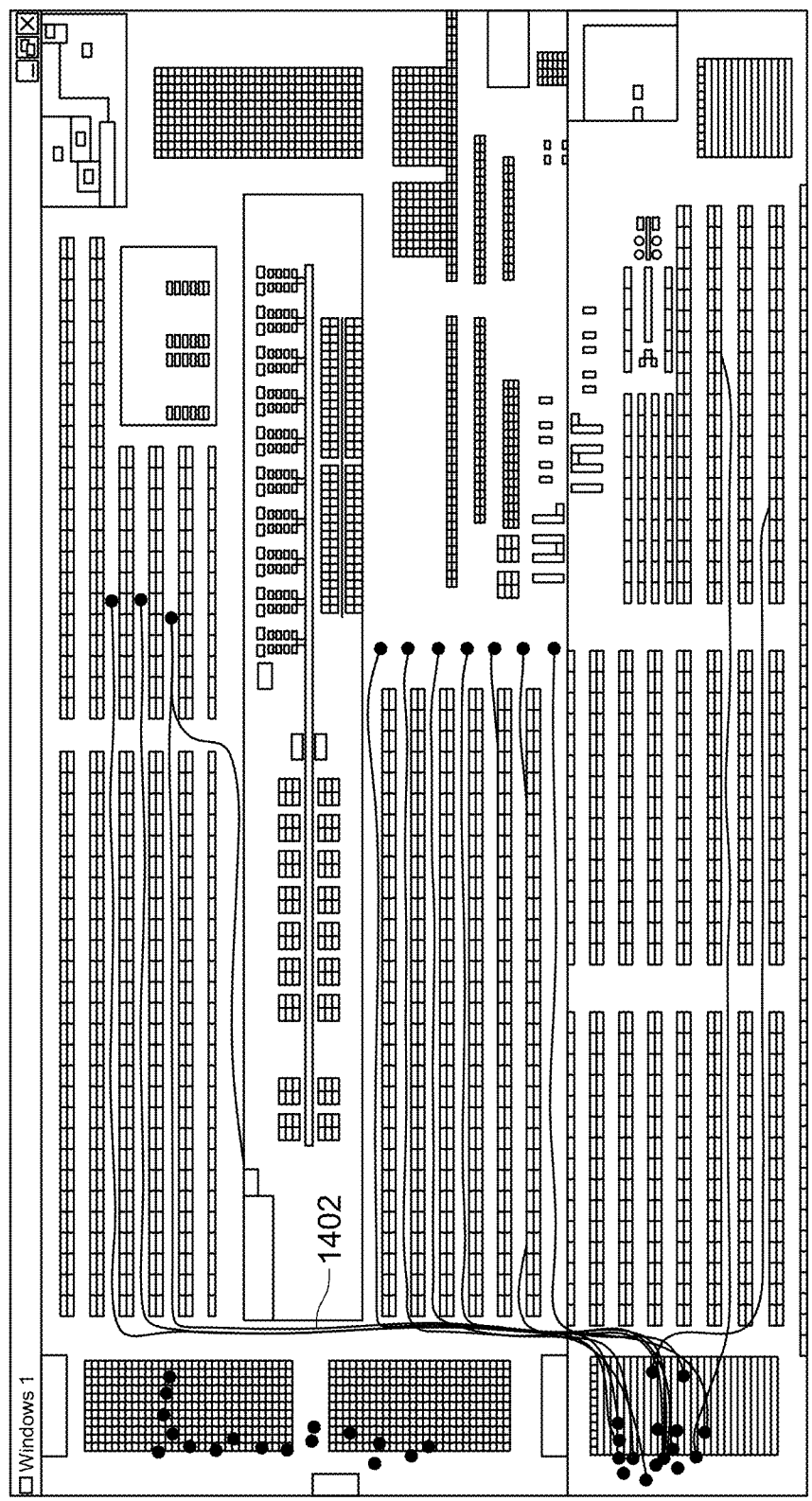
FIG. 14 depicts another GUI illustrating congestion areas of a facility using PITs in accordance with embodiments of the present disclosure.

FIG. 13 depicts a GUI 1300 of two graphs 1302 and 1304 illustrating performance of a plurality of PITs over time in accordance with embodiments of the present disclosure FIG. 14 depicts a GUI 1400 illustrating congestion areas 1402 of a facility using PITs in accordance with embodiments of the present disclosure.

In conclusion, the previously disclosed methods, devices, and systems provide improved tracking that may be installed on various types of PITs to better guide operators and alleviate stress during their shifts. The HMI 212 provides nearly exact locations for both pick-up and drop-off and brings the data to/from the backend systems 118 (e.g., ERP system). By the operator interacting with the HMI 212, learning time for the operator decreases allowing for more productivity as well as efficiency. The operator can see correct or incorrect pickups and drop-offs of items in near real-time on the HMI 212. The disclosed methods, devices, and systems provide information when maintenance is needed on PITs. This minimizes costs and also grades operators on their individual performance for supervisors. The disclosed methods, devices, and systems further provide detailed reports and is an ideal solution for a more smooth transition from manual processes to fully autonomous processes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on a localized computing system for improving material handler efficiency, the method comprising:
   providing map overlay data to a human machine interface (HMI) communicatively coupled with the localized computing system;
   receiving, over a wireless network, pickup location data from a customer information system for an item;
   receiving, over the wireless network, drop-off location data from the customer information system for the item;
   receiving current Light Detection and Ranging (LIDAR) based location data associated with a powered industrial truck (PIT);
   providing display relative pickup location data to the HMI, wherein the display relative pickup location data is associated with the pickup location data and the map overlay data;
   providing display relative drop-off location data to the HMI, wherein the display relative drop-off location data is associated with the drop-off location data and the map overlay data, wherein the pickup location and the drop-off location are associated with a plurality of storage racks;
   providing display relative current location data to the HMI, wherein:
      the display relative current location data is associated with the current location data and the map overlay data;
      the localized computing system is mechanically coupled with PIT;
      the HMI is mechanically coupled with the PIT and configured to be accessible to an operator of the PIT; and
      the HMI is configured to display a first graphical user interface (GUI) based on the map overlay data, the display relative pickup location data, the display relative drop-off location data, the display relative current location data;
   receiving first operator input data from the HMI, wherein the first operator input data is indicative of the operator of the PIT viewing the first GUI;
   transmitting the current LIDAR based location data over the wireless network to a remote computing system, wherein the remote computing system is configured to monitor a plurality of PITs;
   receiving current height data from a draw-wire encoder positioned on the PIT, and the current height data is associated with a current height of forks on the PIT; and
   transmitting at least a portion of the current height data over the wireless network to the remote computing system;
   receiving current scanned data from a scanner sensor, and the current scanned data is associated with at least one of a pickup procedure and a drop-off procedure of the item; and
   transmitting at least a portion of the current scanned data over the wireless network to the remote computing system;
   receiving a first message via the wireless network indicating at least one of a successful pickup and an unsuccessful pickup of the item; and
   providing to the HMI, upon receiving the first message, a first indication of the at least one of the successful pickup and the unsuccessful pickup, wherein the at least one of the successful pickup and the unsuccessful pickup is determined based at least partially on the pickup location data, the drop-off location data, the current LIDAR based location data, the current height data, and the current scanned data.

2. The method of claim 1, wherein the PIT is at least one of a forklift, a picker, a reach truck, a pallet truck, and a stacker.

3. The method of claim 1, wherein:
   the current location data is determined via a Light Detection and Ranging (LIDAR) system; and
   the LIDAR system is mechanically coupled with the PIT.

4. The method of claim 1, wherein the current location data is received over the wireless network.

5. The method of claim 1, wherein the map overlay data is received over the wireless network.

6. The method of claim 1, wherein the map overlay data is associated with physical structures of at least one of a manufacturing facility and a storage facility.

7. The method of claim 1, wherein the scanner sensor is at least one of a radio-frequency identification (RFID) scanner sensor, a barcode scanner sensor, and a quick response (QR) code scanner sensor.

8. The method of claim 1 further comprising:
   receiving a second message via the wireless network indicating at least one of a successful drop-off and an unsuccessful drop-off of the item; and
   providing to the HMI, upon receiving the second message, a second indication viewable to the operator of the at least one of the successful drop-off and the unsuccessful drop-off, wherein the at least one of the successful drop-off and the unsuccessful drop-off is determined based at least partially on the pickup location data, the drop-off location data, the current location data, and the current height data.

9. The method of claim 8, wherein the remote computing system is configured to determine an efficiency value associated with the operator based at least partially on a delta time between the successful pickup and the successful drop-off.

10. The method of claim 8, wherein the remote computing system is configured to determine an efficiency value associated with the operator based at least partially on at least one of the unsuccessful pickup and the unsuccessful drop-off.

11. The method of claim 8, wherein;
    the PIT is one of a plurality of PITs communicatively coupled with the remote computing system over the wireless network;
    the operator is one of a plurality of operators associated with the plurality of PITs; and
    the remote computing system is configured to determine an efficiency value of each of the plurality of operators based at least partially on a delta time between the successful pickup and the successful drop-off.

12. The method of claim 8 further comprising transmitting a unique operator identification (ID) associated with the operator, wherein the unique operator ID is received from at least one of the HMI and the scanner sensor.

13. The method of claim 12, wherein:
    the PIT is a previously assembled fully operator functional PIT; and
    the localized computing system, the draw-wire encoder, and the scanning sensor are configured to be installed on the previously assembled fully operator functional PIT.

14. A localized computing system for improving material handler efficiency, the localized computing system comprising:

one or more processors;
one or more memories electrically coupled with the one or more processor; and
program instructions stored in the one or more memories, wherein the program instructions when executed by the one or more processors perform a method, the method comprising:
providing map overlay data to a human machine interface (HMI) communicatively coupled with the localized computing system;
receiving, over a wireless network, pickup location data from a customer information system for an item;
receiving, over the wireless network, drop-off location data from the customer information system for the item;
receiving current Light Detection and Ranging (LIDAR) based location data associated with a powered industrial truck (PIT);
providing display relative pickup location data to the HMI, wherein the display relative pickup location data is associated with the pickup location data and the map overlay data;
providing display relative drop-off location data to the HMI, wherein the display relative drop-off location data is associated with the drop-off location data and the map overlay data, wherein the pickup location and the drop-off location are associated with a plurality of storage racks;
providing display relative current location data to the HMI, wherein:
the display relative current location data is associated with the current location data and the map overlay data;
the localized computing system is mechanically coupled with PIT;
the HMI is mechanically coupled with the PIT and configured to be accessible to an operator of the PIT; and
the HMI is configured to display a first graphical user interface (GUI) based on the map overlay data, the display relative pickup location data, the display relative drop-off location data, the display relative current location data;
receiving first operator input data from the HMI, wherein the first operator input data is indicative of the operator of the PIT viewing the first GUI;
transmitting the current LIDAR based location data over the wireless network to a remote computing system, wherein the remote computing system is configured to monitor a plurality of PITs;
receiving current height data from a draw-wire encoder positioned on the PIT, and the current height data is associated with a current height of forks on the PIT; and
transmitting at least a portion of the current height data over the wireless network to the remote computing system;
receiving current scanned data from a scanner sensor, and the current scanned data is associated with at least one of a pickup procedure and a drop-off procedure of the item; and
transmitting at least a portion of the current scanned data over the wireless network to the remote computing system
receiving a first message via the wireless network indicating at least one of a successful pickup and an unsuccessful pickup of the item; and
providing to the HMI, upon receiving the first message, a first indication of the at least one of the successful pickup and the unsuccessful pickup, wherein the at least one of the successful pickup and the unsuccessful pickup is determined based at least partially on the pickup location data, the drop-off location data, the current LIDAR based location data, the current height data, and the current scanned data.

15. A non-transitory computer-readable storage medium storing program instructions to be implemented on a localized computing system that includes one or more processors, the program instructions when executed by the one or more processors cause the localized computing system to perform a method, the method comprising:
providing map overlay data to a human machine interface (HMI) communicatively coupled with the localized computing system;
receiving, over a wireless network, pickup location data from a customer information system for an item;
receiving, over the wireless network, drop-off location data from the customer information system for the item;
receiving current location Light Detection and Ranging (LIDAR) based data associated with a powered industrial truck (PIT);
providing display relative pickup location data to the HMI, wherein the display relative pickup location data is associated with the pickup location data and the map overlay data;
providing display relative drop-off location data to the HMI, wherein the display relative drop-off location data is associated with the drop-off location data and the map overlay data, wherein the pickup location and the drop-off location are associated with a plurality of storage racks;
providing display relative current location data to the HMI, wherein:
the display relative current location data is associated with the current location data and the map overlay data;
the localized computing system is mechanically coupled with PIT;
the HMI is mechanically coupled with the PIT and configured to be accessible to an operator of the PIT; and
the HMI is configured to display a first graphical user interface (GUI) based on the map overlay data, the display relative pickup location data, the display relative drop-off location data, the display relative current location data;
receiving first operator input data from the HMI, wherein the first operator input data is indicative of the operator of the PIT viewing the first GUI;
transmitting the current LIDAR based location data over the wireless network to a remote computing system, wherein the remote computing system is configured to monitor a plurality of PITs;
receiving current height data from a draw-wire encoder positioned on the PIT, and the current height data is associated with a current height of forks on the PIT; and
transmitting at least a portion of the current height data over the wireless network to the remote computing system;
receiving current scanned data from a scanner sensor, and the current scanned data is associated with at least one of a pickup procedure and a drop-off procedure of the item; and transmitting at least a portion of the current scanned data over the wireless network to the remote computing system receiving a first message via the wireless network indicating at least one of a successful pickup and an unsuccessful pickup of the item; and providing to the HMI, upon receiving the first message, a first indication of the at least one of the successful pickup and the unsuccessful pickup, wherein the at least one of the successful pickup and the unsuccessful pickup is determined based at least partially on the pickup location data, the drop-off location data, the current LIDAR based location data, the current height data, and the current scanned data.

16. The method of claim 1 further comprising:

receiving current weight height data from a weight sensor positioned on the PIT; and transmitting at least a portion of the current weight data over the wireless network to the remote computing system, wherein the at least one of the successful pickup and the unsuccessful pickup is further determined based on the current weight data.

* * * * *